United States Patent [19]
Kass et al.

[11] Patent Number: 5,516,137
[45] Date of Patent: May 14, 1996

[54] JAW ASSEMBLY FOR A FIFTH WHEEL HITCH

[75] Inventors: John J. Kass, Granger, Ind.; Philip K. Hoopes, Union, Mich.; Thomas W. Lindenman, South Bend; Richard McCoy, Granger, both of Ind.

[73] Assignee: Reese Products, Inc., Elkhart, Ind.

[21] Appl. No.: 345,197

[22] Filed: Nov. 28, 1994

[51] Int. Cl.$^6$ ................................................ B62D 53/12
[52] U.S. Cl. ............................................................ 280/434
[58] Field of Search ........................... 280/433, 434, 280/435, 436, 437

[56] References Cited

U.S. PATENT DOCUMENTS

| | | | |
|---|---|---|---|
| 2,041,124 | 4/1936 | Francis | 280/434 |
| 2,925,286 | 2/1960 | Hodges, Jr. et al. | 280/434 |
| 2,977,137 | 3/1961 | Durham | 280/434 |
| 3,171,672 | 3/1965 | Dalton | 280/437 |
| 3,318,616 | 5/1967 | Fontaine et al. | 280/434 |
| 3,630,545 | 12/1971 | Fontaine et al. | 280/434 |
| 3,844,584 | 10/1974 | Fontaine | 280/434 |
| 3,888,514 | 6/1975 | Klein | 280/434 |
| 4,477,100 | 10/1984 | Elyakim | 280/434 |
| 4,721,323 | 1/1988 | Czuk et al. | 280/433 |
| 4,946,183 | 8/1990 | Benson et al. | 280/434 |
| 5,120,080 | 6/1992 | Ritter | 280/234 X |

FOREIGN PATENT DOCUMENTS 2121876  12/1972  Germany ............................ 280/434

*Primary Examiner*—Eric D. Culbreth
*Assistant Examiner*—Kevin Hurley
*Attorney, Agent, or Firm*—King & Schickli

[57] ABSTRACT

A jaw assembly for a fifth wheel hitch includes a support plate, a jaw bolt mounted for relative sliding movement on the support plate between open and closed positions and a trigger for positively holding the jaw bolt in the open position. A spring is connected between the jaw bolt and trigger in such a way as to perform the dual function of biasing the jaw bolt toward the closed position and biasing the trigger into engagement with the jaw bolt so as to hold the jaw bolt open. When the trigger is engaged by a trailer king pin that is to be held in the jaw assembly, the jaw bolt is released and closes under action of the biasing spring.

14 Claims, 4 Drawing Sheets

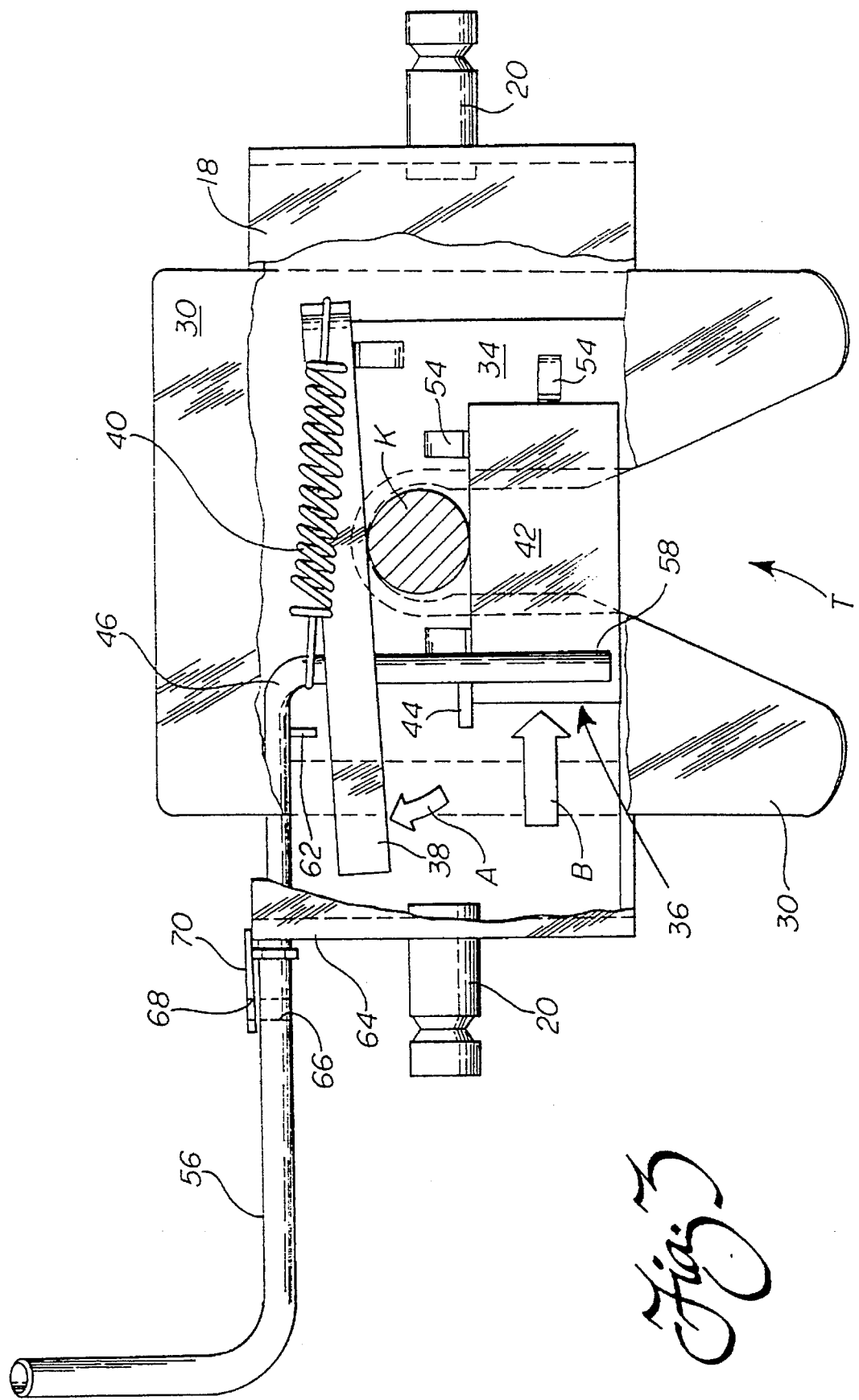

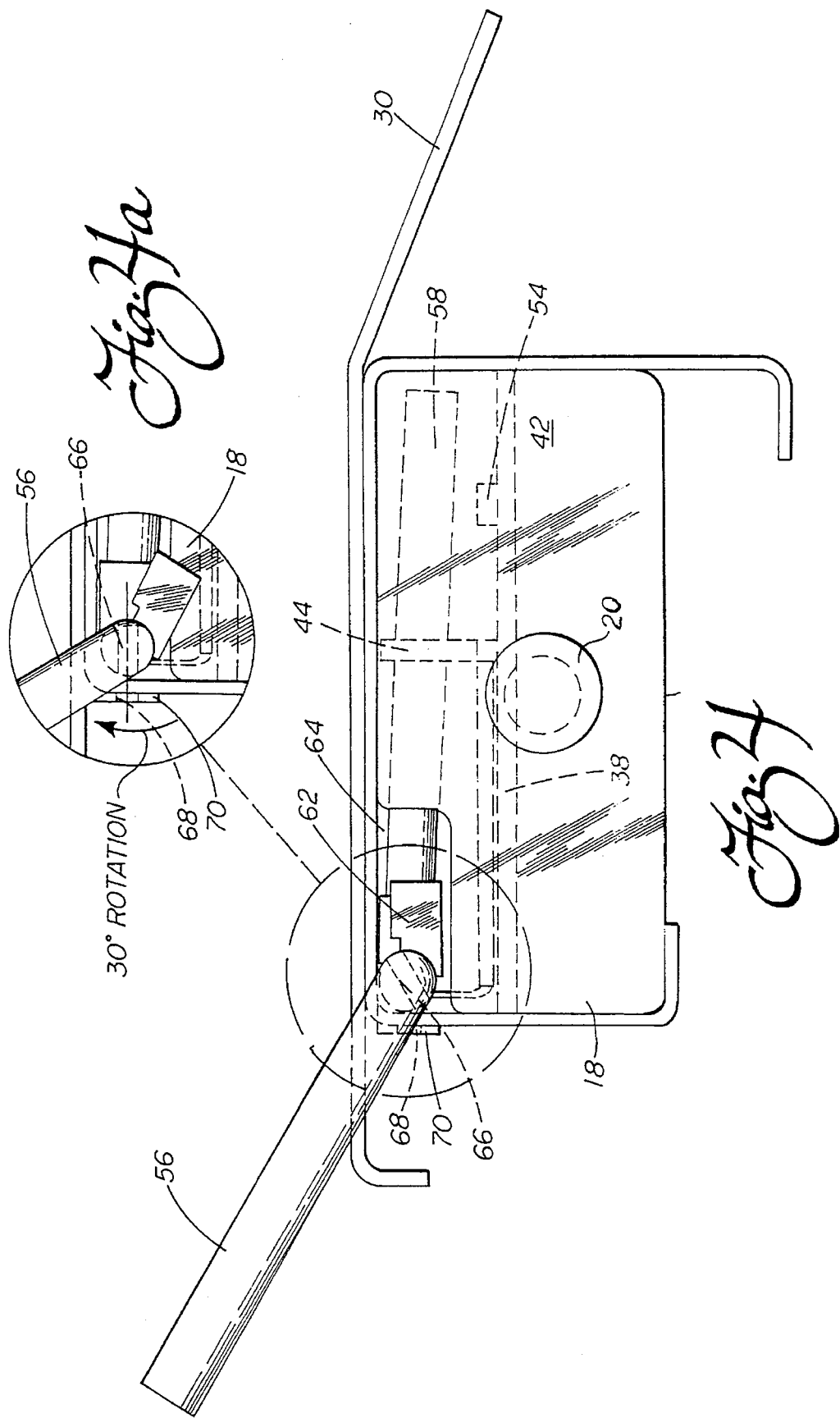

JAW ASSEMBLY FOR A FIFTH WHEEL HITCH

TECHNICAL FIELD

The present invention relates generally to the trailer towing field and, more particularly, to an improved jaw assembly for a fifth wheel hitch.

BACKGROUND OF THE INVENTION

Fifth wheel hitches for towing a trailer behind a towing vehicle have long been known in the art. Examples of state of the art fifth wheel hitches include those presently manufactured by Reese Products, Inc. of Elkhart, Ind. under product numbers 30026, 30027 and 30028 and U.S. Pat. No. 4,721,323.

These state of the art fifth wheel hitches include a support frame for mounting the hitch to the towing vehicle, such as, for example, to a bed of a pick up truck. This support frame includes a pair of mounting rails that are bolted to the bed and/or frame of the truck, side brackets that are releasably mounted to the rails and a head support mounted to the side brackets. A head assembly is mounted to the head support by means of a trunnion arrangement allowing for pivotal fore-and-aft movement. The head assembly includes a jaw assembly, operable by means of a control handle, that is specifically adapted to releasably engage and hold a king pin of a trailer desired to be towed by the towing vehicle.

While such state of the art fifth wheel hitches provide excellent overall performance and dependable operation, it is believed that improvements in design are still possible. More specifically, it is desired to manufactured such hitches at reduced cost without compromising the overall performance of the hitches in the field. State of the art fifth wheel hitches of prior art design generally include a relatively complex jaw assembly that includes a large number of component parts. As a result, most jaw assemblies of prior art design are expensive to manufacture. The complicated operation and interaction of the high number of parts also increases the difficulty of assembly. A need is therefore identified for an improved jaw assembly for a fifth wheel hitch.

SUMMARY OF THE INVENTION

Accordingly, it is a primary object of the present invention to provide a jaw assembly for a fifth wheel hitch that is relatively inexpensive to produce and easily assembled and/or maintained to provide reliable performance over a long service life.

Another object of the present invention is to provide a jaw assembly with smooth, positive controls that provide ease of operation and user confidence in product performance.

Still another object of the present invention is to provide a fifth wheel hitch incorporating a unique jaw assembly that provides smooth, reliable overall operation and that may be simply and conveniently locked into an open or closed position as desired by the operator.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a jaw assembly of simplified structure and reduced manufacturing and assembling costs is provided for a fifth wheel hitch as used for towing a trailer behind a vehicle. The jaw assembly includes a support plate. A jaw bolt is mounted for relative sliding movement on the support plate. Specifically, the jaw bolt may be selectively moved between an open position for receiving the king pin of the trailer to be towed and a closed position for holding the king pin during towing.

The jaw assembly also includes a biasing means, in the form of a spring, for biasing the jaw bolt into the closed position. Additionally, the jaw assembly includes a releasable trigger for positively holding the jaw bolt in the open position. As part of the simplified structure of the jaw assembly, the spring that biases the jaw bolt toward the closed position also biases the trigger toward the jaw in the open position. The jaw bolt is only released to close under the biasing force of the spring when the king pin of the trailer to be connected to the vehicle is properly received in the jaw and head assembly so as to "trip" the trigger.

More specifically describing the invention, the jaw bolt includes an integral stop and integral control handle. The stop is engaged by the trigger when the jaw bolt is held open. The control handle allows for manual manipulation of the jaw bolt into the open position against the force of the biasing spring when disconnecting a trailer from the hitch. Advantageously, the control handle is a welded structure for purposes of rigid connection and absolute positive control.

The trigger is an elongated rod or bar that is mounted by means of a pivot to the support plate. A first end of the trigger engages the stop on the jaw bolt so as to hold the jaw bolt open. The biasing means, in the form of a tension spring has a first end connected to the handle of the jaw bolt and a second end connected to the second end of the trigger. Thus, by operation of the spring and the pivot of the trigger the movement of the jaw assembly between the open and closed positions is controlled.

In accordance with still another aspect of the present invention, the jaw assembly includes means for locking the jaw bolt in both the open and closed positions. More specifically, the control handle includes an aperture therein. When the jaw bolt is in the closed position, this aperture is aligned with a matching aperture in a cooperating stationary bracket mounted to the housing of the head of the fifth wheel hitch. A padlock or other locking pin may be extended through the aligned apertures in the bracket and control handle to lock the jaw bolt closed. This provides added security during towing and otherwise serves as a deterrent to trailer theft.

For convenience of operation during trailer connection the jaw assembly may also be secured in the open position. More specifically, the control handle comprises two sections: a solid L-shaped rod integrally welded as a part of the jaw bolt and an L-shaped tube that is partially received as a sleeve over the solid rod. The two sections are connected together to form an S-shaped control handle. The connection is by means of a spring pin received in a cooperating aperture in the rod and an elongated slot in the L-shaped tube. This slot allows the tube section of the handle to be rotated on the rod through an angle of approximately 30°. This allows a tab on the tube section of the control handle to be positioned to engage a stop, such as the side of the housing of the head assembly, to hold the jaw bolt in the open position. To release this lock, the tube section is rotated on the rod section so as to bring the tab away from engagement with the housing of the head assembly to an orientation where there is sufficient clearance for the tab to pass through an opening into the housing, thereby allowing the jaw bolt to move into the closed position.

In accordance with yet another aspect of the present invention, a fifth wheel hitch is provided incorporating the unique jaw assembly just described.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 3 is a top plan view similar to FIG. 2 but showing the jaw assembly in the closed position for securely holding a king pin of a trailer;

FIG. 4 is an elevational view along line 4—4 of FIG. 2 showing the lances or guides for guiding the jaw bolt and the operation of the control handle.

FIG. 4a is an alternate position view showing 30° rotation of the control handle.

Reference will now be made in detail to the present preferred embodiment of the invention, an example of which is illustrated in the accompanying drawing.

DETAILED DESCRIPTION OF THE INVENTION

Figure 1:
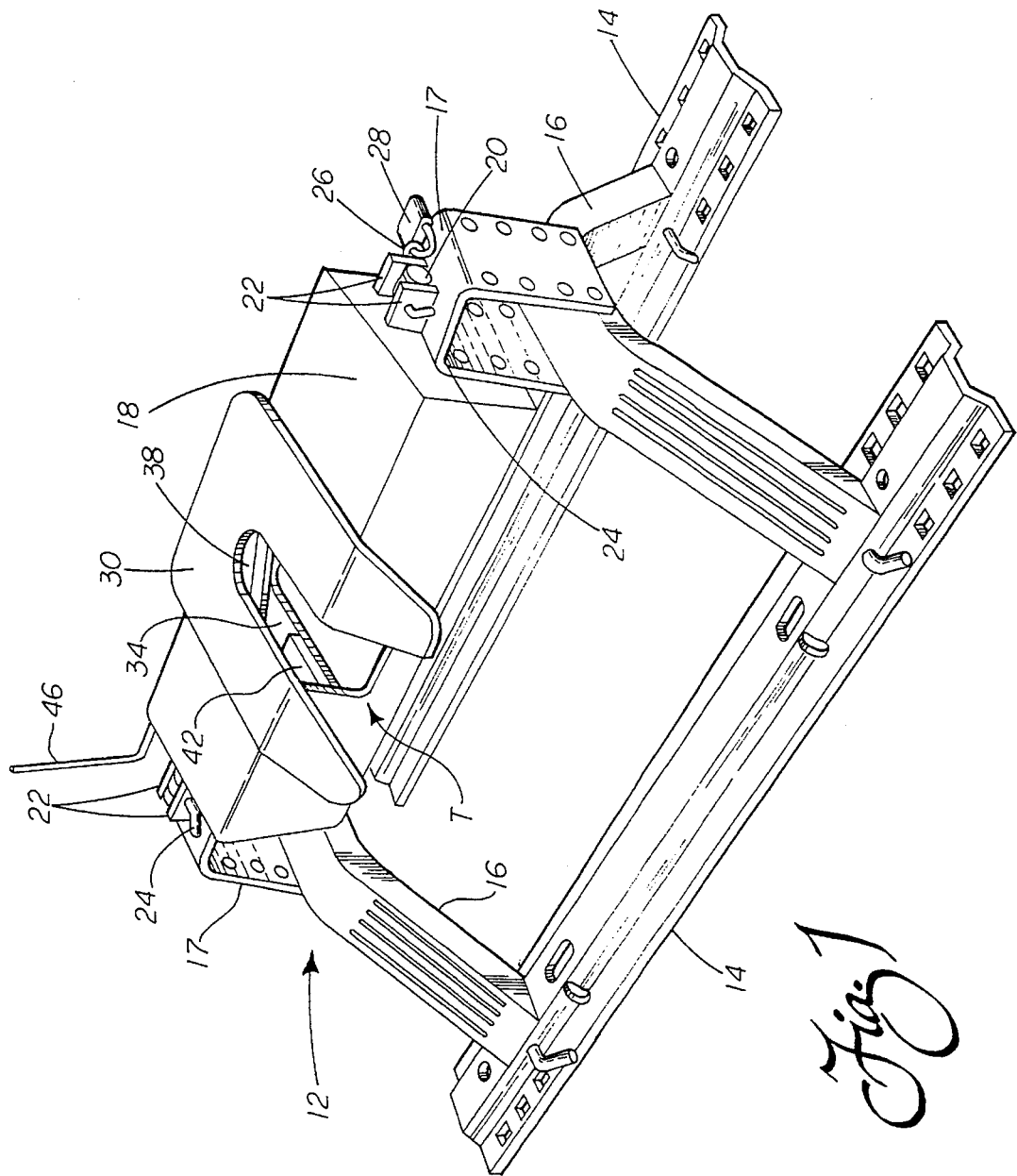
FIG. 1 is a perspective view of a fifth wheel hitch incorporating the jaw assembly of the present invention.

Reference is now made to the drawing figures showing the improved jaw assembly 10 of the present invention. Such a jaw assembly 10 may be incorporated into the head of a fifth wheel hitch 12 of a type such as shown in FIG. 1. It should be appreciated, however, that the description of the fifth wheel hitch 12 should only be considered as being illustrative and that the jaw assembly 10 is not limited to specific application in this specific design of hitch.

The fifth wheel hitch 12 includes a support frame comprising a pair of spaced, parallel rails 14 that are bolted to the frame of the towing vehicle (not shown), a pair of side brackets 16 that are releasably secured to the rails so as to straddle the rear axle of the towing vehicle and a cross member head support 17, extending between the side brackets.

A head assembly 18 is mounted to the head support 17. Specifically, the head assembly 18 includes two, opposed and laterally projecting pivot pins 20. Each pivot pin 20 is received in a cooperating cradle 22 at opposing lateral ends of the head support 17 and secured in position by a connecting pin 24. Accordingly, the head assembly 18 pivots in the fore-and-aft direction on the head support 17 during towing of a trailer. As further known in the art these connecting pins 24 may be secured in position by means of cooperating links 26 and a padlock 28 as desired.

As should further be appreciated from reviewing FIG. 1, the head assembly 18 includes a top plate 30 that defines a throat T for receipt and passage of the king pin of a trailer to be connected to the towing vehicle. Housed within the head assembly 18 is the jaw assembly 10 of the present invention.

Figure 2:
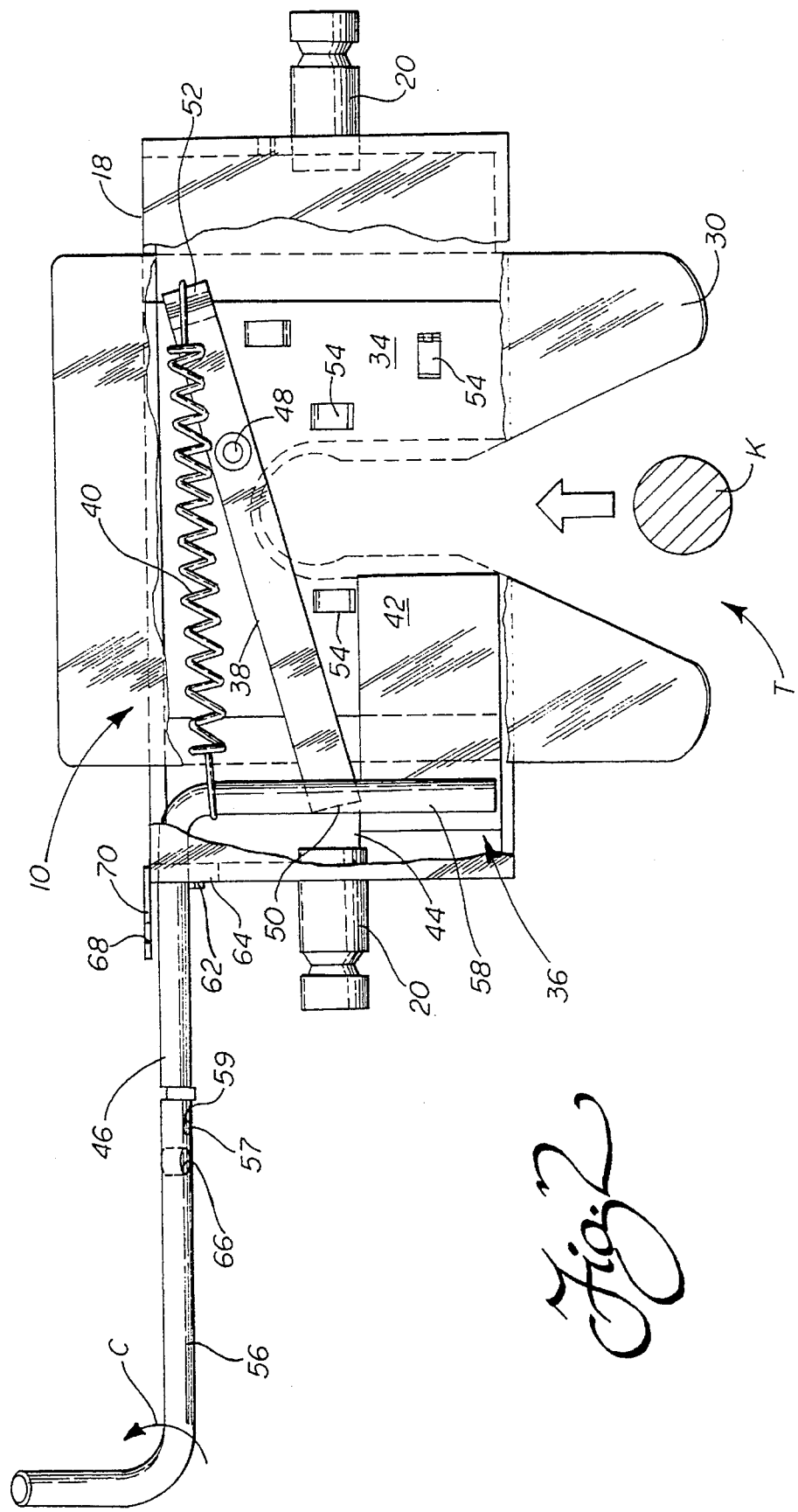
FIG. 2 is a top plan view showing the jaw assembly in the open position for receiving the king pin of a trailer.

As best shown with reference to FIG. 2, the jaw assembly 10 includes a support plate 34 that is secured within the housing of the head assembly 18 by any appropriate means known in the art. The jaw assembly 10 also includes a jaw bolt, generally designated by reference numeral 36, an associated trigger 38 and a biasing means in the form of a tension spring 40. The jaw bolt 36, trigger 38 and spring 40 cooperative in a manner described in greater detail below to provide a jaw mechanism of simplified structure allowing smooth, convenient and reliable operation.

The jaw bolt 36 comprises a latch 42 with an integral stop 44 and integral control handle 46. More particularly, the latch 42, stop 44 and handle 46 components may be welded together to form a single, rigid piece fully responsive to manual operator inputs.

The trigger 38 may be formed from an elongated bar or rod of metal. As shown, the trigger 38 is pivotally mounted on a stub shaft or pivot pin 48 connected to the support plate 34. When the jaw assembly 10 is in the open position as shown in FIG. 2, a first end 50 of the trigger 38 engages the stop 44 to hold the jaw bolt 36 open, thereby leaving the throat T open for the receipt and passage of a trailer king pin K.

The tension spring 40 includes a first end that is connected to the control handle 46 of the jaw bolt 36 and a second end connected to the second end 52 of the trigger 38. In this structural arrangement the spring 40 serves a dual function. Specifically, it biases the trigger about the pivot pin 48 so as to urge the first end 50 of the trigger into engagement with the stop 44 on the jaw bolt 36. Thus, the jaw bolt 36 is positively held against the force of the spring 40 in the open position shown in FIG. 1. When the trigger 38 is tripped, the spring 40 biases the jaw bolt 36 toward the closed position shown best with reference to FIG. 3.

More specifically, as the king pin of the trailer passes through the throat T and is fully received within the head assembly 18 of the fifth wheel hitch 12, the king pin K contacts or engages the trigger 38. As a result, the trigger 38 is pivoted rearwardly about pin 48 (note action arrow A), releasing the first end 50 of the trigger from the stop 44. The force of the spring 40 then causes the jaw bolt 36 to slide (note action arrow B) to the closed position wherein the latching bolt 42 extends across and closes the throat T. Thus, the king pin K of the trailer is captured in the jaw assembly 10 for towing.

The smooth and reliable operation of the jaw assembly 10 is insured in a number of ways. The jaw assembly 10 includes a minimum number of component parts. Of course, this also makes the jaw assembly 10 less expensive and easier to assemble and maintain. Lances 54 are formed in the support plate 34 in the necessary positions to function as guides and stops, engaging the sides of the latch 42 and thereby providing positive and accurate location and eliminating unwarranted play that leads to balky and less precise operation, particularly over time. Additionally, the rigid connection of the control handle 46 to the latch 42 insures positive control for user-confident operation.

In accordance with still further aspects of the present invention, it should be appreciated that the control handle 46 allows the jaw assembly 10 to be locked in either the open position of FIG. 2 or the closed position of FIG. 3. Specifically as shown best in FIG. 4, the control handle 46 comprises two sections. The first L-shaped section 56 preferably comprises a tube that is received over the proximal end of the second L-shaped section 58 that preferably comprises a solid rod. That rod section 58 includes a distal end welded to the latch 42.

More specifically, the tubular section 56 fits snugly over a portion of one leg of the L-shaped rod section 58. The two sections 56, 58 are secured together by means of a spring pin 57 that is received in an elongated slot 59 in the tubular section 56 and an aligned aperture (not shown) in the rod section 58. This arrangement allows the tubular section 56 to be rotated up to 30°, as shown in FIG. 4a, about the longitudinal axis of the leg of rod section 58 over which the tubular section is received.

As further shown in FIGS. 1, 4 and 4a, a tab 62 is welded to the tube section 56. When the control handle 46 is in a first position, the tab 62 extends downwardly in a first radial direction from the tube section 56 so as to engage the housing of the head assembly 18 thereby preventing the jaw bolt 36, regardless of the position of the trigger 38, from moving under the force of the spring 40 into the closed position. Thus, the jaw assembly 10 may be positively maintained in the open position when desired such as when connecting a trailer to the towing vehicle.

By rotating (note action arrow C in FIG. 2) the tube section 56 downwardly substantially 30° relative to rod section 58, the control handle 46 is placed in a second operative position. In this position, the tab 62 extends forwardly out of engagement with the housing of the head assembly 18 where the tab may pass through the housing opening 64. Now when the trigger 38 is engaged by the trailer king pin K so as to release the stop 44, the jaw bolt 36 is freely urged into the closed position. There it may be securely locked for towing.

More specifically, the control handle 46 includes a locking aperture 66. This locking aperture 66 is aligned with a cooperating aperture 68 in bracket 70 mounted to the housing of the head assembly 18. By inserting the shank of a padlock or other locking pin (not shown) in the aligned apertures 66, 68, the jaw assembly 10 may be positively secured in the closed position. This provides added security during towing and serves as an effective deterrent of trailer theft.

In summary, numerous benefits result from employing the concepts of the present invention. The jaw assembly 10 has a simple design incorporating few component parts. It is, therefore, inexpensive to produce and maintain while also providing consistent, dependable operation. Fewer component parts also mean lighter weight which is a significant advantage to the user when installing the head assembly 18 on the side brackets 16 of the hitch 12. The welded control handle 46 also provides a rigid means for manipulating the jaw bolt 36, This positive control and solid feel engender confidence in the user.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A jaw assembly for a fifth wheel hitch, comprising:

a support plate;

a jaw bolt mounted for relative sliding movement on said support plate between open and closed positions;

a releasable trigger for positively holding said jaw bolt in the open position; and means for biasing said jaw bolt into the closed position said biasing means having a first end connected to said jaw bolt and a second end connected to said trigger.

2. The jaw assembly set forth in claim 1, wherein said jaw bolt includes a stop, said trigger engaging said stop to hold said jaw bolt in the open position.

3. The jaw assembly set forth in claim 1, wherein said jaw bolt includes a handle for manually manipulating said jaw bolt into the open position.

4. The jaw assembly set forth in claim 3, wherein said handle is substantially S-shaped and includes means for selectively locking said jaw bolt in either of the open or closed positions.

5. The jaw assembly set forth in claim 1, wherein said trigger is pivotally mounted to said support plate and is elongated thereby including first and second ends.

6. The jaw assembly set forth in claim 5, wherein said jaw bolt includes (1) a stop that is engaged by said first end of said trigger to hold said jaw bolt in the open position and (2) a handle for manually manipulating said jaw bolt into the open position.

7. The jaw assembly set forth in claim 6, wherein said biasing means is a tension spring having a first end operatively connected to said handle and a second end operatively connected to said second end of said trigger whereby said first end of said trigger is biased into engagement with said stop on said jaw bolt.

8. The jaw assembly set forth in claim 7, wherein said handle includes means for selectively locking said jaw bolt in either of the open or closed positions.

9. The jaw assembly set forth in claim 8, wherein said control handle includes two sections and means for mounting a first of said sections for rotation relative to a second of said sections.

10. The jaw assembly set forth in claim 9, wherein a tab is provided on said first section.

11. The jaw assembly set forth in claim 8, further including means on said support plate for guiding said jaw bolt between said open and closed positions.

12. A jaw assembly for a fifth wheel hitch comprising:

a support plate;

a jaw bolt mounted for relative sliding movement on said support plate between open and closed positions, said jaw bolt including a stop;

a releasable trigger for engaging said stop to positively hold said jaw bolt in the open position; and means for biasing said jaw bolt into the closed position, said biasing means including a tension spring having a first end connected to said jaw bolt and a second end connected to said trigger.

13. A fifth wheel hitch assembly for towing a trailer behind a towing vehicle, comprising:

a frame including a means for mounting said frame to the towing vehicle;

a head assembly;

means for mounting said head assembly for pivotal movement relative to said frame; and a jaw assembly for engaging the trailer to be towed by the towing vehicle, said jaw assembly being carried by said head assembly and including:

(a) a support plate;

(b) a jaw bolt mounted for relative sliding movement on said support plate between open and closed positions;

(c) a releasable trigger for positively holding said jaw bolt in the open position; and (d) means for biasing said jaw bolt into the closed position, said biasing means having a first end connected to said jaw bolt and a second end connected to said trigger.

14. A fifth wheel hitch assembly for towing a trailer behind a towing vehicle, comprising:

a frame including a means for mounting said frame to the towing vehicle;

a head assembly; means for mounting said head assembly for pivotal movement relative to said frame; and a jaw assembly for engaging the trailer to be towed by the towing vehicle, said jaw assembly being carried by said head assembly and including:

(a) a support plate;

(b) a jaw bolt mounted for relative sliding movement on said support plate between open and closed positions, said jaw bolt including (1) a stop that is engaged by said first end of said trigger to hold said jaw bolt in the open position and (2) a handle for manually manipulating said jaw bolt into the open position;

(c) a releasable trigger for positively holding said jaw bolt in the open position, said trigger being pivotally mounted to said support plate and elongated so as to thereby include first and second ends; and (d) means for biasing said jaw bolt into the closed position, said biasing means including a tension spring having a first end operatively connected to said handle and a second end operatively connected to said second end of said trigger whereby said first end of said trigger is biased into engagement with said stop on said jaw bolt.

* * * * *